March 26, 1929.  F. H. FARRELL  1,706,958
LIQUID LEVEL INDICATOR
Filed May 28, 1921  2 Sheets-Sheet 1
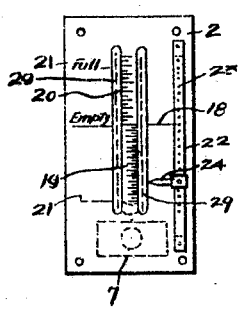
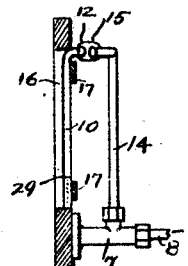
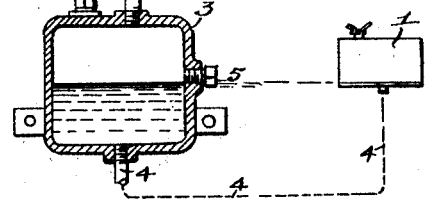
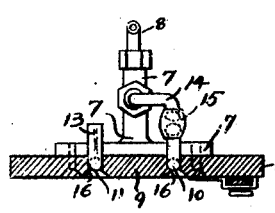
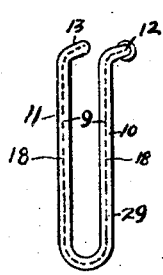
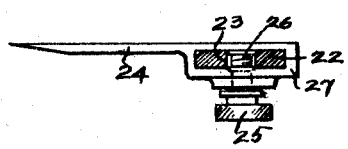
Fred H. Farrell Inventor
By N. S. Amstutz
Attorney

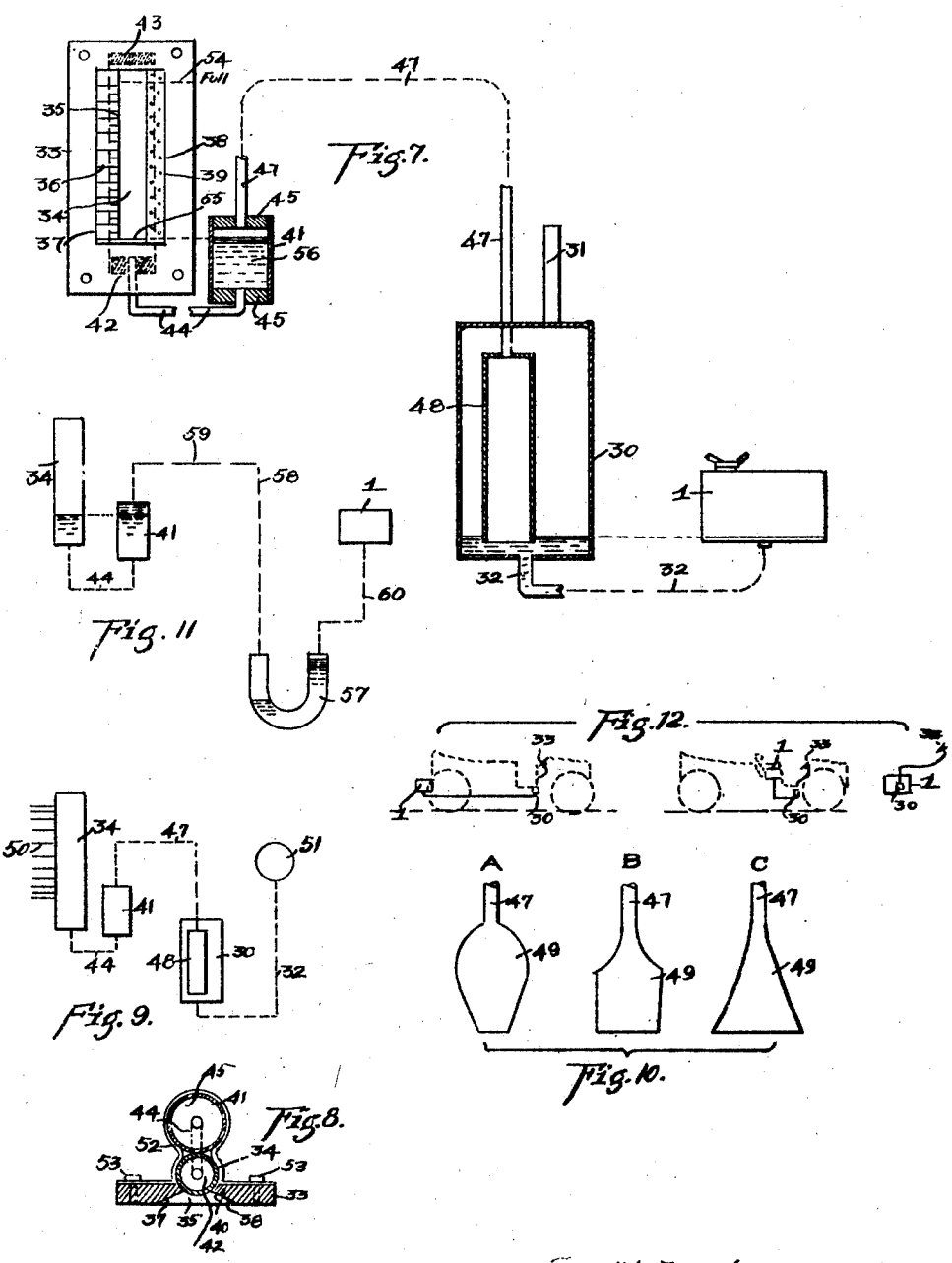

Patented Mar. 26, 1929.

1,706,958

UNITED STATES PATENT OFFICE.

FRED H. FARRELL, OF VALPARAISO, INDIANA, ASSIGNOR TO THE UNIVERSAL DEVICE COMPANY, OF CHICAGO, ILLINOIS.

LIQUID-LEVEL INDICATOR.

Application filed May 28, 1921. Serial No. 473,307.

My invention relates to improvements in liquid-level indicators and it more especially relates to the features pointed out in the annexed claims.

The purpose of my invention is to provide an automatic indicator, for automobile gasoline tanks, located on the dash in front of the driver, that will indicate the quantity of gasoline in the car tank without the use of mechanically moving parts; that is easily installed; that requires no periodic adjustments; that is not affected in a practical sense by temperature fluctuations; that is economical to manufacture, as well as highly efficient in operation; and that is free from sympathetic fluctuations with car jolts, etc.

With these and other ends in view, I illustrate in the accompanying drawings such instances of adaptation as will disclose the broad underlying features without limiting myself to the specific details shown thereon and described herein, Figure 1 is a front view of applicant's liquid level indicator.

Fig. 2 is a side elevation of Fig. 1 partly in section.

Fig. 3 is a diagrammatic sectional view of a trap in relation to a gasoline tank.

Fig. 4 is a plan view of Fig. 1 partly in section.

Fig. 5 is an enlarged plan view of a sliding pointer.

Fig. 6 is a detached view of a mercury filled U-tube.

Fig. 7 is a diagrammatic elevation of the relation of parts in a modified form of indicator.

Fig. 8 is a plan view in section of the indicator shown in Fig. 7.

Fig. 9 is a diagram of variably divided scale in its relation to a round tank.

Fig. 10 shows several diagrams of variable trap tube ends.

Fig. 11 is a diagrammatic view of a modified U shaped trap system.

Fig. 12 is a diagrammatic view showing various relations of gas tanks, indicators and traps.

In carrying my invention into practice, I may employ either a high or low specific gravity indicating system, not being limited to either type, or combinations of these. The broad ground underlying the invention comprises an intermediate system of pipes etc., between an automobile gasoline tank and a visual indicator placed on the dash to show the quantity of liquid in the tank without the use of mechanical moving parts in any portion of the system.

The high specific gravity system is illustrated by Figs. 1 to 6 inclusive, and the low specific gravity system by Figs. 7 to 10 inclusive. An intermediate gravity pressure system is shown in Fig. 11. The broader features of the invention are included in Figs. 2, 3, 7, 9 and 11, while the others show various exemplifications of construction.

The usual gasoline tank 1 is connected (Figs. 2 and 3) by a pipe 4, with an intermediate container 3 that may be called a trap, which is located at any suitable point between the tank and indicator or in the tank itself. From the trap 3 another pipe 8 leads to the fitting 7, from hence a pipe 14 leads across an elastic air-tight connection 15 to the descending tube 10 past the enlargement 12. The tube 10 is a part of the U shaped mercury indicator 9, which, with its ascending tube 11 that has an open-ended bend at 13, is secured to the indicator board or plate 2 by suitable straps 17, while the tubes are in slots 16 of plate 2.

Retracing the connections to the trap 3 of Fig. 3, provision is made by means of a plug 5, to observe the "starting" conditions when the system is first put into operation. A filling plug 6 closes an opening in the top or upper face of the trap. In first equipping a car with the device whether inside or outside of the tank, the bottom surface of the tank is positioned in the same level as the bottom edge of the hole for plug 5 while the car is on a level surface. Gasoline is then poured into the top opening 6 until it reaches the predetermined level of the bottom of hole 5, when the plug 6 is inserted and afterward plug 5 is placed in position completing the installation.

The trap or equalizing chamber 3 whether it is placed inside or near to the tank 1 on its outside prevents large fluctuations of the gasoline level in main supply tank 1 being transmitted to the indicator 2 such large fluctuations are usually due to the car passing over rough places in the roadway which will cause the contents of the tank 1 to splash vigorously from end to end of the tank. The surface area of the liquid in the chamber 3 compared to the surface area of the liquid in the tank 1 is so small that a sudden tilt of the car either to the right or the left is relatively inappreciable in the chamber 3. The necessity for this equalizing chamber arises from the fact that the main supply tanks of cars are usually placed crosswise of the direction of travel thus subjecting the contents to severe and rapid fluctuations from end to end of the tank. In case the trap or equalizing chamber 3 is placed directly inside the tank 1 near its bottom the bottom pipe 4 is omitted allowing free access of the liquid of the tank 1 into the chamber 3 so as to compress the air in the chamber which will actuate the mercury in the indicator.

When the equalizing chamber 3 is placed outside of the tank 1 but near to it its proper vertical position is readily determined by first having the car stand on a surface that is level lengthwise and crosswise of the car and then placing the chamber 3 at such a height while connected by the pipe 4 to the tank 1 so that when gasoline flows into this pipe it will rise in the chamber 3 until it starts to flow out of the opening normally closed by the plug 5 and at the same time will not rise above the level of the bottom of the tank. The chamber 3 is secured to the car at the height, thus determined, in any suitable manner and the plug 5 is used to close the tank level indicating opening of the chamber 3 which completes this part of the installation. It is of course immaterial whether the pipe 4 is filled through the tank 1 or through an air opening in the top of the chamber 3 which is normally closed by a plug 6.

The empty point on plate 2 is indicated by the numeral 18, in the mid portion of the board or plate 2. Below the midpoint a descending scale 19 is placed, and above said point an ascending scale 20 is also provided. The tank full point may be marked on both scales at 21. As the gasoline tank 1 is being filled, the mercury 29 in tube 10 descends and in the tube 11 it ascends correspondingly. This action is due to the incoming gasoline forcing the imprisoned air, or any liquid or gaseous responsive medium, in the trap 3 out through tubes 8 and 14 into 10 where it encounters the mercury at the mid point 18. At this point the pressure on the column of air forces the mercury downward until the "full-point" 21 is reached. During the use of the car the gasoline is gradually drawn from the tank 1 and the trap 3 by the engine, thus allowing the air to gradually come back into the trap and the mercury to follow upward in tube 10 and downward in tube 11, until both tubes show it standing at the empty mark 18.

Should it be desired to quickly determine the quantity of gasoline used within a certain period of time or over a certain number of miles, a trip gauge may be placed alongside the tube 10 or tube 11. In the drawing, the pointer of such a gauge is shown at 24. To the pointer a head 27 is attached, or it may be formed as a part thereof. The head slides over a series of holes 23 in the strip 22. A thumb screw 25, which has a stem 26 designed to enter holes 23, serves to lock the pointer 24 in any one of the holes occurring opposite the level of the mercury at that time. After the run, or other interval, the new mercury point is observed and its distance from the pointer quickly defines the inches of gasoline reduction in the tank, or the gallons of gasoline that have been used, as desired. More than one sliding pointer may be used, if any combination of circumstances make such an expedient useful.

Whenever this device is installed by automobile manufacturers, the scales 19 and 20 may be graduated in gallons or otherwise, to conform to the peculiar cross section of gasoline tank which is being made. Another manufacturer who is putting out another type of tank will require scales adapted thereto. When the device is installed by the owner of a car, it may be simply graduated to represent vertical inches of tank contents. If the user desires to have the readings in gallons direct, he may make his own marks by putting separate gallons successively into the tank and making a mark opposite the mercury level for each gallon.

It is not necessary that both scales 19 and 20 are used at the same time, as either one can be used alone thus carrying out the idea of a single tube indicator shown in Fig. 7 at 34.

Whenever an indicating medium lighter than mercury is used, a scale having its divisions further apart can be made, or any other magnifying expedient may be used, such as a change in area, ratios etc. In carrying out such an adaptation, a trap similar to 30 may be used instead of trap 3, or as an equivalent of the latter. The trap 30 may have an air vent 31 to permit the contents of the trap being fully responsive to the gasoline changes in tank 1. A pipe 32 leads from tank 1 to the trap 30, but under some circumstances, or all if desired, the trap may also be placed directly in the tank 1. A tube 47 leads from the trap 30 to the equalizing cup or magnifier 41. This tube enters the trap 30 and it terminates in a special type of inlet 48 for such tube.

The equalizer 41 is closed at its ends by plugs 45, or these may be closed by forming them integrally with the body. From here a tube 44 leads to the bottom plug or cap 42 of the indicating tube 34. The tube 34 is of larger diameter than the mercury filled tubes 10 and 11, because a lighter indicating medium 56 is used. At the upper end of the tube 34, a perforated plug 43 is placed to prevent the egress of its contents but still permit the admission of air therethrough. The plate 33 has a slotted opening 35 into which a part of the indicating tube 34 projects. From the slot 35, beveled faces 37 and 38 lead to the front surface of the plate. On the face 37, graduations 36 of any desired order may be placed; and on the face 38, a series of holes 39 are formed in which headed plugs 40 may be placed by the user to fix any desired arbitrary indicating points. The full point may be at or near the numeral 34, and the empty point at 55.

The scale shown in Fig. 7 is uniformly divided, as would be the case with square cross section gas tanks, but with round tanks 51 a variable division scale 50 would result alongside of tube 34. If a uniformly divided scale is desired under various tank cross-section conditions, compensating termini 49 may be employed of the order shown at A, B, or C on Fig. 10 or any required variations of these. The tube 41 in Fig. 7, for clarity in the view, is shown along side of the indicator board or plate 33; but as a matter of fact, it may be placed behind it as shown in Fig. 8, wherein a retaining band 52 passes partly around the tubes 41 and 34 and is attached to the plate by screws 53.

In Fig. 11 a "sealed in" type system is shown diagrammatically. In this a U tube 57 takes the place of trap 30. It is connected by a pipe 60 with tank 1 and by a pipe 58, that is provided with a closed filling inlet 59, to the equalizer 41. This system may use a combination of non-mixing liquids of different specific gravities as the responsive medium in 57, 58, 41 and 34.

It is immaterial whether this invention be applied to automobile or other uses, as it is not limited to the adaptation exemplified herein. The use of the phrase "mechanical means" in the claims is confined to the connections between the tank and the indicator tube. If any desired amplifying means actuated by the non-mechanical responsive medium in such connections is caused to actuate a pivoted pointer, in any well known way, it is to be considered extraneous of the responsiveness of the medium between the tank and the indicator.

What I claim is:

In a liquid level indicator for the tank of a movable vehicle, a fuel tank positioned with its lengthwise dimension transverse of the vehicle, an indicator comprising a U shaped tube positioned on the dash of the vehicle one leg of such tube being open to the air at its upper end, a support for the tube, indicating means positioned on the support approximately midway of the tube length, an equalizing chamber of very small internal area having an opening in its upper face, a tube in the opening connecting the chamber to the upper end of the other leg of the indicator tube, a tube from the bottom of the chamber to the tank, means in the side wall of the chamber for opening and closing the same, means for supporting the chamber on the vehicle in relation to the tank so that when the pipe which connects the chamber to the tank is filled with liquid it will rise in the chamber and flow out of the side opening when such opening is on a level with the bottom of the tank, and opening and closing means located in the top wall of the chamber to admit air into the chamber when needed.

In testimony whereof I affix my signature.

FRED H. FARRELL.